United States Patent
Oprins

(10) Patent No.: US 10,465,131 B2
(45) Date of Patent: Nov. 5, 2019

(54) PROCESS FOR THE PRODUCTION OF LIGHT OLEFINS AND AROMATICS FROM A HYDROCARBON FEEDSTOCK

(71) Applicants: SAUDI BASIC INDUSTRIES CORPORATION, Riyadh (SA); SABIC Global Technologies B.V., Bergen op Zoom (NL)

(72) Inventor: Arno Johannes Maria Oprins, Maastricht (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 43 days.

(21) Appl. No.: 14/902,068

(22) PCT Filed: Jun. 30, 2014

(86) PCT No.: PCT/EP2014/063851
§ 371 (c)(1),
(2) Date: Dec. 30, 2015

(87) PCT Pub. No.: WO2015/000843
PCT Pub. Date: Jan. 8, 2015

(65) Prior Publication Data
US 2017/0009157 A1 Jan. 12, 2017

(30) Foreign Application Priority Data

Jul. 2, 2013 (EP) .................................. 13174767

(51) Int. Cl.
*C10G 69/06* (2006.01)
*C10G 65/10* (2006.01)
(Continued)

(52) U.S. Cl.
CPC ............. *C10G 69/06* (2013.01); *C10G 65/10* (2013.01); *C10G 67/0445* (2013.01);
(Continued)

(58) Field of Classification Search
CPC ........ C10G 69/00; C10G 69/02; C10G 69/04; C10G 69/06; C10G 67/00; C10G 67/02; C10G 67/0445; C10G 65/10
See application file for complete search history.

(56) References Cited

U.S. PATENT DOCUMENTS 3,172,834 A * 3/1965 Kozlowski ................ C10L 1/06
208/111.25
3,256,176 A  6/1966 Mills et al.
(Continued)

FOREIGN PATENT DOCUMENTS

CN  101208412  6/2008
EP  0192059 A1  8/1986
(Continued)

OTHER PUBLICATIONS

Halim et al., "Effect of Operating Conditions on Hydrodesulfurization of Vacuum Gas Oil," *Iraqi Journal of Chemical and Petroleum Engineering*, 2008, 57-67.
(Continued)

*Primary Examiner* — Prem C Singh
*Assistant Examiner* — Brandi M Doyle
(74) *Attorney, Agent, or Firm* — Norton Rose Fulbright US LLP

(57) ABSTRACT

The present invention relates to a process for increasing the production of a light olefin hydrocarbon compound from a hydrocarbon feedstock, comprising the following steps of: (a) feeding a hydrocarbon feedstock into a reaction area for ringopening (b) separating reaction products, which are generated from said reaction area, into an overhead stream
(Continued)

and a side stream; (c) feeding the side stream from (b) to a gasoline hydrocracker (GHC) unit, (d) separating reaction products of said GHC of step (c) into an overhead stream, which contains hydrogen, methane, ethane, and liquefied petroleum gas, and a stream, which contains aromatic hydrocarbon compounds, and a small amount of hydrogen and non-aromatic hydrocarbon compounds, (e) feeding the overhead stream from the gasoline hydrocracker (GHC) unit into a steam cracker unit.

1 Claim, 1 Drawing Sheet

(51) Int. Cl.
C10G 67/04 (2006.01)
C10G 69/00 (2006.01)

(52) U.S. Cl.
CPC ..... *C10G 69/00* (2013.01); *C10G 2300/1044* (2013.01); *C10G 2300/1059* (2013.01); *C10G 2400/20* (2013.01); *C10G 2400/30* (2013.01); *Y02P 30/40* (2015.11)

(56) References Cited

U.S. PATENT DOCUMENTS

| | | | |
|---|---|---|---|
| 3,433,848 | A | 3/1969 | Devins et al. |
| 3,842,138 | A | 10/1974 | Chahvekilian et al. |
| 4,137,147 | A * | 1/1979 | Franck ............... B01J 29/20 208/61 |
| 4,181,601 | A | 1/1980 | Sze |
| 4,789,457 | A | 12/1988 | Ficher et al. |
| 4,827,072 | A | 5/1989 | Imai et al. |
| 4,926,005 | A | 5/1990 | Olbrich et al. |
| 6,153,087 | A | 11/2000 | Bigeard et al. |
| 6,270,654 | B1 | 8/2001 | Colyar et al. |
| 7,067,448 | B1 | 6/2006 | Weitkamp et al. |
| 7,214,308 | B2 | 5/2007 | Colyar |
| 7,513,988 | B2 | 4/2009 | Oballa et al. |
| 7,622,623 | B2 | 11/2009 | Fridman et al. |
| 7,704,377 | B2 | 4/2010 | Duddy et al. |
| 7,938,952 | B2 | 5/2011 | Colyar et al. |
| 8,926,824 | B2 | 1/2015 | Morel |
| 9,005,430 | B2 | 4/2015 | Fournier et al. |
| 9,840,674 | B2 | 12/2017 | Weiss et al. |
| 2005/0101814 | A1 * | 5/2005 | Foley ............... C10G 45/62 585/317 |
| 2006/0287561 | A1 * | 12/2006 | Choi ............... C10G 57/00 585/324 |
| 2007/0062848 | A1 * | 3/2007 | Oballa ............... C10G 45/44 208/113 |
| 2007/0090018 | A1 | 4/2007 | Keusenkothen et al. ..... 208/106 |
| 2008/0093262 | A1 | 4/2008 | Gragnani et al. |
| 2009/0173665 | A1 | 7/2009 | Zhou et al. |
| 2014/0299515 | A1 | 10/2014 | Weiss et al. |
| 2016/0122666 | A1 | 5/2016 | Weiss et al. |

FOREIGN PATENT DOCUMENTS

| | | |
|---|---|---|
| FR | 2364879 A1 | 4/1978 |
| FR | 2366239 A1 | 4/1978 |
| GB | 2162082 A | 1/1986 |
| JP | 2009508881 | 3/2009 |
| WO | 0244306 A1 | 6/2002 |
| WO | 2007055488 A1 | 5/2007 |
| WO | 2010102712 A2 | 6/2010 |
| WO | 2012135111 A2 | 10/2012 |
| WO | WO 2016/146326 | 9/2016 |

OTHER PUBLICATIONS

Office Action issued in European Application No. 14733659, dated Feb. 10, 2017.
Alfke et al. (2007) Oil Refining, Ullmann's Encyclopedia of Industrial Chemistry.
English Abstract of WO2010102712(A2); Date of Publication: Sep. 19, 2010; 2 Pages.
Folkins (2000) Benzene, Ullmann's Encyclopedia of Industrial Chemistry.
International Search Report for International Application No. PCT/EP2014/063851; International Filing Date: Jun. 30, 2014; dated Sep. 8, 2014; 5 Pages.
Machine Translation of FR2364879; Date of Publication: Apr. 14, 1978; 26 Pages.
Machine Translation of FR2366239(A1); Date of Publication: Apr. 28, 1978; 12 Pages.
Speight (2005) Petroleum Refinery Process, Kirk-Othmer Encyclopedia of Chemical Technology.
Table VI, p. 295, Pyrolysis: Theory and Industrial Practice by Lyle R Albright et al., Academic Press 1983.
Written Opinion of the International Searching Authority for International Application No. PCT/EP2014/063851; International Filing Date: Jun. 30, 2014; dated Sep. 8, 2014; 6 Pages.
Office Action issued in Chinese Patent Application No. 201480037272.7 dated Sep. 25, 2017.
Examination Report issued in Gulf Cooperation Coucil Application No. 2014/27470, dated Mar. 29, 2017.
Office Action issued in Japanese Patent Application No. 2016-522561, dated Feb. 20, 2018.

* cited by examiner

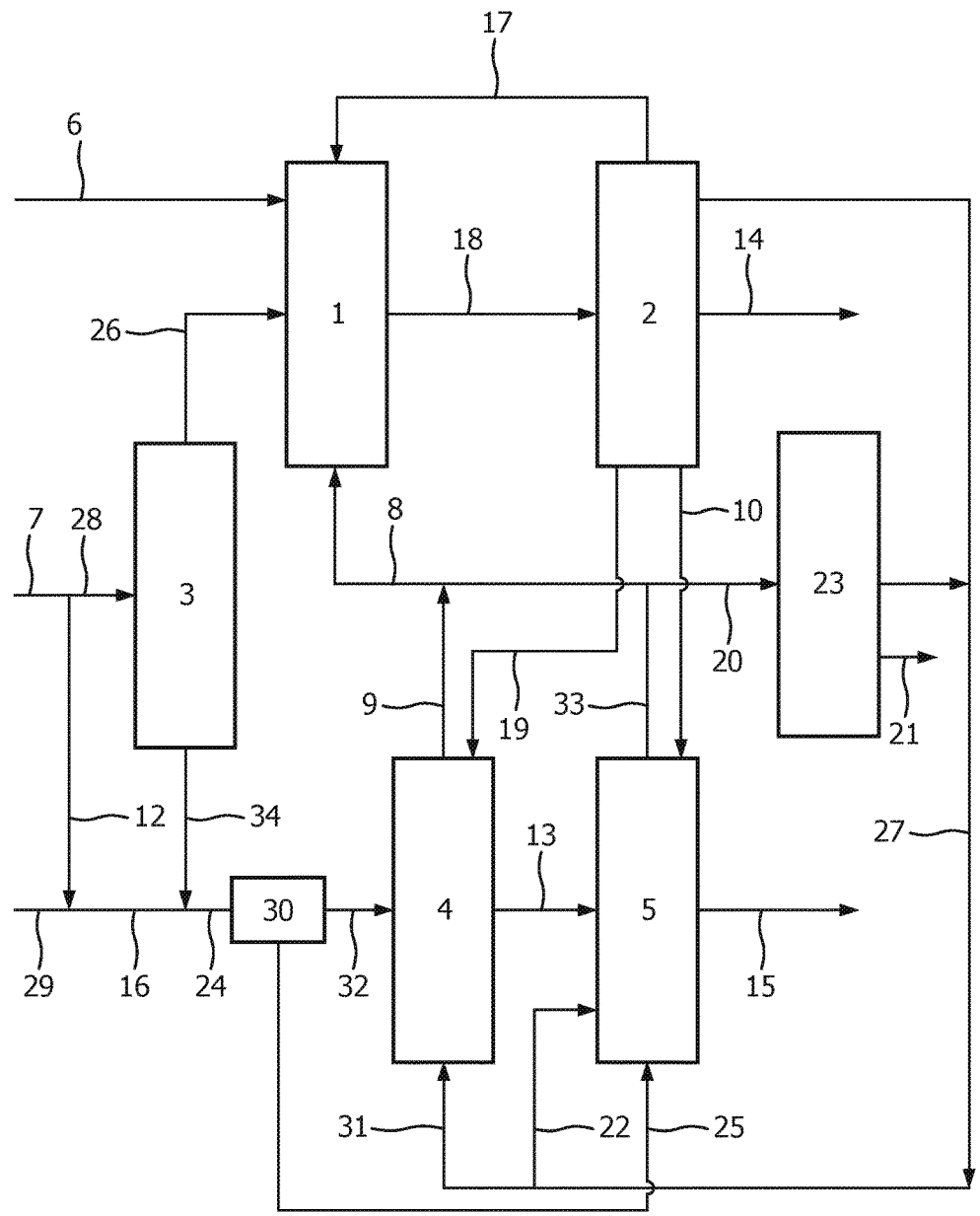

PROCESS FOR THE PRODUCTION OF LIGHT OLEFINS AND AROMATICS FROM A HYDROCARBON FEEDSTOCK

CROSS REFERENCE TO RELATED APPLICATIONS

This application is a National Stage application of PCT/EP2014/063851, filed Jun. 30, 2014, which claims the benefit of European Application No. 13174767.7, filed Jul. 2, 2013, both of which are incorporated by reference in their entirety herein.

The present invention relates to a process for the production of light olefins and aromatics from a hydrocarbon feedstock.

Conventionally, crude oil is processed, via distillation, into a number of cuts such as naphtha, gas oils and residua. Each of these cuts has a number of potential uses such as for producing transportation fuels such as gasoline, diesel and kerosene or as feeds to some petrochemicals and other processing units.

Light crude oil cuts such as naphthas and some gas oils can be used for producing light olefins and single ring aromatic compounds via processes such as steam cracking in which the hydrocarbon feed stream is evaporated and diluted with steam then exposed to a very high temperature (800° C. to 860° C.) in short residence time (<1 second) furnace (reactor) tubes. In such a process the hydrocarbon molecules in the feed are transformed into (on average) shorter molecules and molecules with lower hydrogen to carbon ratios (such as olefins) when compared to the feed molecules. This process also generates hydrogen as a useful by-product and significant quantities of lower value co-products such as methane and C9+ Aromatics and condensed aromatic species (containing two or more aromatic rings which share edges).

Typically, the heavier (or higher boiling point) aromatic species, such as residua are further processed in a crude oil refinery to maximize the yields of lighter (distillable) products from the crude oil. This processing can be carried out by processes such as hydro-cracking (whereby the hydrocracker feed is exposed to a suitable catalyst under conditions which result in some fraction of the feed molecules being broken into shorter hydrocarbon molecules with the simultaneous addition of hydrogen). Heavy refinery stream hydrocracking is typically carried out at high pressures and temperatures and thus has a high capital cost.

An aspect of such a combination of crude oil distillation and steam cracking of the lighter distillation cuts is the capital and other costs associated with the fractional distillation of crude oil. Heavier crude oil cuts (i.e. those boiling beyond ~350° C.) are relatively rich in substituted aromatic species and especially substituted condensed aromatic species (containing two or more aromatic rings which share edges) and under steam cracking conditions these materials yield substantial quantities of heavy by products such as C9+ aromatics and condensed aromatics. Hence, a consequence of the conventional combination of crude oil distillation and steam cracking is that a substantial fraction of the crude oil is not processed via the steam cracker as the cracking yield of valuable products from heavier cuts is not considered to be sufficiently high, or at least when compared to alternative refinery value.

Another aspect of the technology discussed above is that even when only light crude oil cuts (such as naphtha) are processed via steam cracking a significant fraction of the feed stream is converted into low value heavy by-products such as C9+ aromatics and condensed aromatics. With typical naphthas and gas oils these heavy by-products might constitute 2 to 25% of the total product yield (Table VI, Page 295, Pyrolysis: Theory and Industrial Practice by Lyle F. Albright et al, Academic Press, 1983). Whilst this represents a significant financial downgrade of expensive naphtha in lower value material on the scale of a conventional steam the yield of these heavy by-products to does not typically justify the capital investment required to up-grade these materials (e.g. by hydrocracking) into streams that might produce significant quantities of higher value chemicals. This is partly because hydrocracking plants have high capital costs and, as with most petrochemicals processes, the capital cost of these units typically scales with throughput raised to the power of 0.6 or 0.7. Consequently, the capital costs of a small scale hydro-cracking unit are normally considered to be too high to justify such an investment to process steam cracker heavy by-products.

Another aspect of the conventional hydrocracking of heavy refinery streams such as residua is that this is typically carried out under compromise conditions chosen to achieve the desired overall conversion. As the feed streams contain a mixture of species with a range of ease of cracking this result in some fraction of the distillable products formed by hydrocracking of relatively easily hydrocracked species being further converted under the conditions necessary to hydrocrack species more difficult to hydrocrack. This increases the hydrogen consumption and heat management difficulties associated with the process and also increases the yield of light molecules such as methane at the expense of more valuable species.

A result of such a combination of crude oil distillation and steam cracking of the lighter distillation cuts is that steam cracking furnace tubes are typically unsuitable for the processing of cuts which contain significant quantities of material with a boiling point greater than ~350° C. as it is difficult to ensure complete evaporation of these cuts prior to exposing the mixed hydrocarbon and steam stream to the high temperatures required to promote thermal cracking. If droplets of liquid hydrocarbon are present in the hot sections of cracking tubes coke is rapidly deposited on the tube surface which reduces heat transfer and increases pressure drop and ultimately curtails the operation of the cracking tube necessitating a shut-down of the tube to allow for decoking. Due to this difficulty a significant proportion of the original crude oil cannot be processed into light olefins and aromatic species via a steam cracker.

The LCO Unicracking process of UOP uses partial conversion hydrocracking to produce high quality gasoline and diesel stocks in a simple once-through flow scheme. The feedstock is processed over a pretreatment catalyst and then hydrocracked in the same stage. The products are subsequently separated without the need for liquid recycle. The LCO Unicracking process can be designed for lower pressure operation, that is the pressure requirement will be somewhat higher than high severity hydrotreating but significantly lower than a conventional partial conversion and full conversion hydrocracking unit design. The upgraded middle distillate product makes a suitable ultra-low sulfur diesel (ULSD) blending component. The naphtha product from low-pressure hydrocracking of LCO has ultra-low sulfur and high octane and can be directly blended into the ultra-low sulfur gasoline (ULSG) pool.

U.S. Pat. No. 7,513,988 relates to a process to treat compounds comprising two or more fused aromatic rings to saturate at least one ring and then cleave the resulting saturated ring from the aromatic portion of the compound to produce a C2-4 alkane stream and an aromatic stream. Such a process may be integrated with a hydrocarbon (e.g. ethylene) (steam) cracker so that hydrogen from the cracker may be used to saturate and cleave the compounds comprising two or more aromatic rings and the C2-4 alkane stream may be fed to the hydrocarbon cracker, or may be integrated with a hydrocarbon cracker (e.g. steam cracker) and an ethylbenzene unit, that is to treat the heavy residues from processing oil sands, tar sands, shale oils or any oil having a high content of fused ring aromatic compounds to produce a stream suitable for petrochemical production.

US2005/0101814 relates to a process for improving the paraffin content of a feedstock to a steam cracking unit, comprising: passing a feedstream comprising C5 through C9 hydrocarbons including C5 through C9 normal paraffins into a ring opening reactor, the ring opening reactor comprising a catalyst operated at conditions to convert aromatic hydrocarbons to naphtenes and a catalyst operated at conditions to convert naphtenes to paraffins, and producing a second feedstream; and passing at least a portion of the second feedstream to a steam cracking unit.

U.S. Pat. No. 7,067,448 relates to a process for the manufacture of n-alkanes from mineral oil fractions and fractions from thermal or catalytic conversion plants containing cyclic alkanes, alkenes, cyclic alkenes and/or aromatic compounds. More in detail, this publication refers to a process for processing mineral oil fractions rich in aromatic compounds, in which the cyclic alkanes obtained after the hydrogenation of the aromatic compounds are converted to n-alkanes of a chain length which as far as possible is less than that of the charged carbons.

US2009/173665 relates to a catalyst and process for increasing the monoaromatics content of hydrocarbon feedstocks that include polynuclear aromatics, wherein the increase in monoaromatics can be achieved with an increase in gasoline/diesel yields and while reducing unwanted compounds thereby providing a route for upgrading hydrocarbons that include significant quantities of polynuclear aromatics.

U.S. Pat. No. 4,137,147 (corresponding to FR 2 364 879 and FR 2 366 239) relates to a selective process for producing light olefinic hydrocarbons chiefly those with 2 and 3 carbon atoms respectively per molecule, particularly ethylene and propylene, which are obtained by hydrogenolysis or hydrocracking followed with steam-cracking.

U.S. Pat. No. 3,842,138 relates to a method of thermal cracking in the presence of hydrogen of a charge of hydrocarbons of petroleum wherein the hydrocracking process is carried out under a pressure of 5 and 70 bars at the outlet of the reactor with very short residence times of 0.01 and 0.5 second and a temperature range at the outlet of the reactor extending from 625 to 1000° C.

The LCO-process as discussed above relates to full conversion hydrocracking of LCO to naphtha, in which LCO is a mono-aromatics and di-aromatics containing stream. A consequence of the full conversion hydrocracking is that a highly naphthenic, low octane naphtha is obtained that must be reformed to produce the octane required for product blending.

An object of the present invention is to provide a method for upgrading naphtha, naphtha condensates and heavy tail feeds to aromatics and LPG cracker feeds.

Another object of the present invention is to provide a process for the production of light olefins and aromatics from a hydrocarbon feedstock in which a high yield of ethylene and propylene can be attained.

Another object of the present invention is to provide a process for the production of light olefins and aromatics from a hydrocarbon feedstock in which a broad spectrum of hydrocarbon feedstocks can be processed, i.e. a high feed flexibility.

Another object of the present invention is to provide a process for the production of light olefins and aromatics from a hydrocarbon feedstock in which a high yield of aromatics can be attained.

The present invention relates to a process for increasing the production of a light olefin hydrocarbon compound from a hydrocarbon feedstock, comprising the following steps of:

(a) feeding a hydrocarbon feedstock into a reaction area for ringopening (b) separating reaction products, which are generated from said reaction area, into an overhead stream and a side stream;

(c) feeding the side stream from (b) to a gasoline hydrocracker (GHC) unit, (d) separating reaction products of said GHC of step (c) into an overhead gas stream, comprising C2-C4 paraffins, hydrogen and methane and a stream comprising aromatic hydrocarbon compounds and non-aromatic hydrocarbon compounds, (e) feeding the overhead gas stream from the gasoline hydrocracker (GHC) unit into a steam cracker unit.

On basis of these steps (a)-(e) one or more of the present objects can be attained. The present inventors found that a full conversion hydrocracking step can be used resulting in the direct conversion of the produced naphthenic naphtha in the GHC into a high quality BTX stream and a very good LPG cracker feed. A difference to the LCO-X process being that in addition to retaining the aromatic rings (or the last aromatic ring in case of ring opening of di and tri aromatics) the present invention also converts the naphthenic species in a single step process largely into BTX as well as a result of the specific conditions in the GHC without the need for a reformer that doesn't yield the high value LPG product suitable for steam cracking, nor the direct production of high quality BTX. When using a ring opening step the advantage of the GHC processing step is that the aromatic product obtained is upgraded to produce BTX and LPG rather than a mix of higher mono-aromatics that would not be suitable for chemicals production but only has a value in gasoline blending. The present invention is more focusing on using the GHC platform to directly produce high quality BTX and high value LPG cracker feed, i.e. also upgrading the 'side chains' of the higher mono-aromatics produced in the LCO-process. Moreover, according to the present invention paraffin species will be converted into high value LPG (and hydrogen 're-claimed' further downstream) and naphthenic species will be converted into BTX, that is to retain the aromatic rings and break down poly aromatic components retaining the last aromatic ring. Effectively the combination of process steps in the present invention allows the present inventors to control the amount of LPG leading to light olefins versus the amount of BTX obtained.

The preferred process conditions for the reaction area for ringopening comprise passing said feed stream to a ring saturation unit at a temperature from 300 [deg.] C. to 500 [deg.] C. and a pressure from 2 to 10 MPa together with from 100 to 300 kg of hydrogen per 1,000 kg of feedstock over an aromatic hydrogenation catalyst and passing the resulting stream to a ring cleavage unit at a temperature from 200 [deg.] C. to 600 [deg.] C. and a pressure from 1 to 12 MPa together with from 50 to 200 kg of hydrogen per 1,000 kg of said resulting stream over a ring cleavage catalyst. The resulting product can be separated into a C2-4 alkanes stream, a liquid paraffinic stream and an aromatic stream. The aromatic hydrogenation catalyst comprises from 0.0001 to 5 weight % of one or more metals selected from the group consisting of Ni, W, and Mo. The ring cleavage catalyst comprises from 0.0001 to 5 weight % of one or more metals selected from the group consisting of Pd, Ru, Is, Os, Cu, Co, Ni, Pt, Fe, Zn, Ga, In, Mo, W, and V on a support, i.e. the support is selected from the group of synthetic zeolites having the characteristics of ZSM-5, ZSM-11, ZSM-12, ZSM-23, Beta and MCM-22.

In a preferred embodiment the present method further comprises pretreating the hydrocarbon feedstock in an aromatics extraction unit, from which aromatics extraction unit its bottom stream is fed into said reaction area for ringopening and its overhead stream is fed into said steam cracker unit.

The aromatics extraction unit is chosen from the group of the type of a distillation unit, a solvent extraction unit and a molecular sieve, or even a combination thereof.

In the embodiment of a solvent extraction unit its overhead stream is washed for removal of solvent, wherein the thus recovered solvent is returned into said solvent extraction unit and the overhead stream thus washed being fed into said steam cracker unit. In such an extraction unit the liquid hydrocarbon feed is in the solvent extraction step first contacted with an immiscible solvent selective for aromatics separation in a suitable solvent extraction column. The boiling temperature of the immiscible solvents selective for aromatics separation must be higher than the boiling temperature of the components to be separated, i.e. extract containing aromatics and naphthenes. A preferred temperature difference between immiscible solvent and the extract is in the range of 10 to 20 degr Celsius. In addition, the immiscible solvent must not decompose at the applied temperatures, i.e. the immiscible solvent must be temperature stabile at the specific process temperature. Examples of solvents are sulfolane, tetra ethylene glycol or N-Methyl pyrolidone. These species are often used in combination with other solvents or other chemicals (sometimes called co-solvents) such as water and/or alcohols. To minimize the risk of damaging the hydrocracking catalyst in the present process, it is preferred to use a non-nitrogen containing solvent such as sulfolane. As the solvent (even when it contains significant quantities of dissolved hydrocarbons) has a higher density than the hydrocarbon species it tends to separate to the base of the extraction column and is withdrawn from there. This "rich solvent" (i.e. solvent containing dissolved hydrocarbons) contains aromatic species which were present in the feed liquid as well as other species which are somewhat soluble in the solvent such as light paraffins, naphthenic species as well as some of the organosulphur species present in the feed. With conventional technologies the presence of the non-aromatic hydrocarbon species causes a difficulty which requires these species to be stripped from the "rich solvent" in a distillation column (together with some of the lower boiling point aromatic compounds) and returned to the solvent extraction column. To ensure that the aromatic product stream is essentially free from non-aromatics contaminants it is necessary to expend significant quantities of energy in stripping out even minor traces of these species from the solvent.

According to a preferred embodiment the reaction products of said steam cracking unit are separated into an overhead stream, comprising C2-C6 alkanes, a middle stream, comprising C2-olefins, C3-olefins and C4-olefins, and a first bottom stream, comprising C9+ hydrocarbons, and a second bottom stream comprising aromatic hydrocarbon compounds and non-aromatic hydrocarbon compounds.

The present process further comprises returning said overhead stream to said steam cracking unit.

In a preferred embodiment of the present invention the second bottom stream is fed into said gasoline hydrocracker (GHC) unit. It is also preferred to feed the first bottom stream predominantly containing carbon black oil (CBO) and cracked distillates (CD) into said reaction area for ringopening. According to another embodiment the bottom stream from reaction products of said gasoline hydrocracker (GHC) unit is separated in a BTX rich fraction and in heavy fraction.

The overhead stream from the gasoline hydrocracker (GHC) unit is preferably fed into a dehydrogenation unit, especially the C3-C4 fraction thereof. In addition it is also preferred to feed said overhead stream from the reaction area for ring opening to a dehydrogenation unit, especially the C3-C4 fraction thereof.

According to the present invention the LPG rich fractions can thus be sent either to the steam cracker unit and/or to the dehydrogenation unit. This provides a high level of flexibility and product diversity. The overhead stream from the reaction area for ring opening and the overhead gas stream from the gasoline hydrocracker (GHC) unit can be indicated as LPG rich fractions.

Processes for the dehydrogenation of lower alkanes such as propane and butanes are described as lower alkane dehydrogenation process. The term "propane dehydrogenation unit" relates to a petrochemical process unit wherein a propane feedstream is converted into a product comprising propylene and hydrogen. Accordingly, the term "butane dehydrogenation unit" relates to a process unit for converting a butane feedstream into C4 olefins.

The present process further comprises recovering a stream rich in mono aromatics from said hydrocarbon feedstock of step (a) and feeding the stream thus recovered to said gasoline hydrocracker (GHC) unit, and recovering a stream rich in mono aromatics from said bottom stream of said aromatics extraction unit and feeding the stream thus recovered to said gasoline hydrocracker (GHC) unit.

From a hydrogen consumption perspective it is preferred to recover hydrogen from the reaction products of said steam cracking unit and feeding the hydrogen thus recovered to said gasoline hydrocracker (GHC) unit and/or said reaction area for ring opening, especially to recover hydrogen from said dehydrogenation unit and feeding the hydrogen thus recovered to said gasoline hydrocracker (GHC) unit and/or said reaction area for ring opening.

Examples of preferred hydrocarbon feedstock to be fed into said reaction area for ring opening are chosen from the group of gasoil, vacuum gas oil (VGO), naphtha and pretreated naphtha, or a combination thereof.

The process conditions prevailing in said reaction area for ring opening have been mentioned above.

The process conditions prevailing in said gasoline hydrocracker (GHC) unit comprise a temperature of 300-450° C., a pressure of 300-5000 kPa gauge and a Weight Hourly Space Velocity of 0.1-10 h−1, preferably a temperature of 300-400° C., a pressure of 600-3000 kPa gauge and a Weight Hourly Space Velocity of 0.2-2 h−1.

The process conditions prevailing in said steam cracking unit will be discussed hereafter.

In the present process preferred examples of feedstock to be sent directly into said steam cracking unit comprise a hydrocarbon feedstock not treated in a series of reaction area(s) for ringopening and gasoline hydrocracker (GHC) unit(s)

The present invention further relates to the use of a gaseous light fraction of a multi stage ring opened hydrocracked hydrocarbon feedstock as a feedstock for a steam cracking unit.

The term "crude oil" as used herein refers to the petroleum extracted from geologic formations in its unrefined form. Any crude oil is suitable as the source material for the process of this invention, including Arabian Heavy, Arabian Light, other Gulf crudes, Brent, North Sea crudes, North and West African crudes, Indonesian, Chinese crudes and mixtures thereof, but also shale oil, tar sands and bio-based oils. The crude oil is preferably conventional petroleum having an API gravity of more than 20° API as measured by the ASTM D287 standard. More preferably, the crude oil used is a light crude oil having an API gravity of more than 30° API. Most preferably, the crude oil comprises Arabian Light Crude Oil. Arabian Light Crude Oil typically has an API gravity of between 32-36° API and a sulfur content of between 1.5-4.5 wt-%.

The term "petrochemicals" or "petrochemical products" as used herein relates to chemical products derived from crude oil that are not used as fuels. Petrochemical products include olefins and aromatics that are used as a basic feedstock for producing chemicals and polymers. High-value petrochemicals include olefins and aromatics. Typical high-value olefins include, but are not limited to, ethylene, propylene, butadiene, butylene-1, isobutylene, isoprene, cyclopentadiene and styrene. Typical high-value aromatics include, but are not limited to, benzene, toluene, xylene and ethyl benzene.

The term "fuels" as used herein relates to crude oil-derived products used as energy carrier. Unlike petrochemicals, which are a collection of well-defined compounds, fuels typically are complex mixtures of different hydrocarbon compounds. Fuels commonly produced by oil refineries include, but are not limited to, gasoline, jet fuel, diesel fuel, heavy fuel oil and petroleum coke.

The term "gases produced by the crude distillation unit" or "gases fraction" as used herein refers to the fraction obtained in a crude oil distillation process that is gaseous at ambient temperatures. Accordingly, the "gases fraction" derived by crude distillation mainly comprises C1-C4 hydrocarbons and may further comprise impurities such as hydrogen sulfide and carbon dioxide. In this specification, other petroleum fractions obtained by crude oil distillation are referred to as "naphtha", "kerosene", "gasoil" and "resid". The terms naphtha, kerosene, gasoil and resid are used herein having their generally accepted meaning in the field of petroleum refinery processes; see Alfke et al. (2007) Oil Refining, Ullmann's Encyclopedia of Industrial Chemistry and Speight (2005) Petroleum Refinery Processes, Kirk-Othmer Encyclopedia of Chemical Technology. In this respect, it is to be noted that there may be overlap between the different crude oil distillation fractions due to the complex mixture of the hydrocarbon compounds comprised in the crude oil and the technical limits to the crude oil distillation process. Preferably, the term "naphtha" as used herein relates to the petroleum fraction obtained by crude oil distillation having a boiling point range of about 20-200° C., more preferably of about 30-190° C. Preferably, light naphtha is the fraction having a boiling point range of about 20-100° C., more preferably of about 30-90° C. Heavy naphtha preferably has a boiling point range of about 80-200° C., more preferably of about 90-190° C. Preferably, the term "kerosene" as used herein relates to the petroleum fraction obtained by crude oil distillation having a boiling point range of about 180-270° C., more preferably of about 190-260° C. Preferably, the term "gasoil" as used herein relates to the petroleum fraction obtained by crude oil distillation having a boiling point range of about 250-360° C., more preferably of about 260-350° C. Preferably, the term "resid" as used herein relates to the petroleum fraction obtained by crude oil distillation having a boiling point of more than about 340° C., more preferably of more than about 350° C.

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons.

The terms "naphthenic hydrocarbons" or "naphthenes" or "cycloalkanes" is used herein having its established meaning and accordingly relates types of alkanes that have one or more rings of carbon atoms in the chemical structure of their molecules.

The term "olefin" is used herein having its well-established meaning. Accordingly, olefin relates to an unsaturated hydrocarbon compound containing at least one carbon-carbon double bond. Preferably, the term "olefins" relates to a mixture comprising two or more of ethylene, propylene, butadiene, butylene-1, isobutylene, isoprene and cyclopentadiene.

The term "LPG" as used herein refers to the well-established acronym for the term "liquefied petroleum gas". LPG generally consists of a blend of C2-C4 hydrocarbons i.e. a mixture of C2, C3, and C4 hydrocarbons.

The term "BTX" as used herein relates to a mixture of benzene, toluene and xylenes.

As used herein, the term "C# hydrocarbons", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C5+ hydrocarbons" is meant to describe a mixture of hydrocarbons having 5 or more carbon atoms. The term "C5+ alkanes" accordingly relates to alkanes having 5 or more carbon atoms.

As used herein, the term "hydrocracker unit" or "hydrocracker" relates to a refinery unit in which a hydrocracking process is performed i.e. a catalytic cracking process assisted by the presence of an elevated partial pressure of hydrogen; see e.g. Alfke et al. (2007) loc.cit. The products of this process are saturated hydrocarbons and, depending on the reaction conditions such as temperature, pressure and space velocity and catalyst activity, aromatic hydrocarbons including BTX. The process conditions used for hydrocracking generally includes a process temperature of 200-600° C., elevated pressures of 0.2-20 MPa, space velocities between 0.1-10 h−1.

Hydrocracking reactions proceed through a bifunctional mechanism which requires a acid function, which provides for the cracking and isomerization and which provides breaking and/or rearrangement of the carbon-carbon bonds comprised in the hydrocarbon compounds comprised in the feed, and a hydrogenation function. Many catalysts used for the hydrocracking process are formed by compositing various transition metals, or metal sulfides with the solid support such as alumina, silica, alumina-silica, magnesia and zeolites.

As used herein, the term "gasoline hydrocracking unit" or "GHC" refers to a refinery unit for performing a hydrocracking process suitable for converting a complex hydrocarbon feed that is relatively rich in aromatic hydrocarbon compounds—such as refinery unit-derived light-distillate including, but not limited to, reformer gasoline, FCC gasoline and pyrolysis gasoline (pygas)—to LPG and BTX, wherein said process is optimized to keep one aromatic ring intact of the aromatics comprised in the GHC feedstream, but to remove most of the side-chains from said aromatic ring. Accordingly, the main product produced by gasoline hydrocracking is BTX and the process can be optimized to provide chemicals-grade BTX. Preferably, the hydrocarbon feed that is subject to gasoline hydrocracking comprises refinery unit-derived light-distillate. More preferably, the hydrocarbon feed that is subjected to gasoline hydrocracking preferably does not comprise more than 1 wt-% of hydrocarbons having more than one aromatic ring. Preferably, the gasoline hydrocracking conditions include a temperature of 300-580° C., more preferably of 450-580° C. and even more preferably of 470-550° C. Lower temperatures must be avoided since hydrogenation of the aromatic ring becomes favorable. However, in case the catalyst comprises a further element that reduces the hydrogenation activity of the catalyst, such as tin, lead or bismuth, lower temperatures may be selected for gasoline hydrocracking; see e.g. WO 02/44306 A1 and WO 2007/055488. In case the reaction temperature is too high, the yield of LPG's (especially propane and butanes) declines and the yield of methane rises. As the catalyst activity may decline over the lifetime of the catalyst, it is advantageous to increase the reactor temperature gradually over the life time of the catalyst to maintain the hydrocracking conversion rate. This means that the optimum temperature at the start of an operating cycle preferably is at the lower end of the hydrocracking temperature range. The optimum reactor temperature will rise as the catalyst deactivates so that at the end of a cycle (shortly before the catalyst is replaced or regenerated) the temperature preferably is selected at the higher end of the hydrocracking temperature range.

Preferably, the gasoline hydrocracking of a hydrocarbon feedstream is performed at a pressure of 0.3-5 MPa gauge, more preferably at a pressure of 0.6-3 MPa gauge, particularly preferably at a pressure of 1-2 MPa gauge and most preferably at a pressure of 1.2-1.6 MPa gauge. By increasing reactor pressure, conversion of C5+ non-aromatics can be increased, but this also increases the yield of methane and the hydrogenation of aromatic rings to cyclohexane species which can be cracked to LPG species. This results in a reduction in aromatic yield as the pressure is increased and, as some cyclohexane and its isomer methylcyclopentane, are not fully hydrocracked, there is an optimum in the purity of the resultant benzene at a pressure of 1.2-1.6 MPa.

Preferably, gasoline hydrocracking of a hydrocarbon feedstream is performed at a Weight Hourly Space Velocity (WHSV) of 0.1-10 h−1, more preferably at a Weight Hourly Space Velocity of 0.2-6 h−1 and most preferably at a Weight Hourly Space Velocity of 0.4-2 h−1. When the space velocity is too high, not all BTX co-boiling paraffin components are hydrocracked, so it will not be possible to achieve BTX specification by simple distillation of the reactor product. At too low space velocity the yield of methane rises at the expense of propane and butane. By selecting the optimal Weight Hourly Space Velocity, it was surprisingly found that sufficiently complete reaction of the benzene co-boilers is achieved to produce on spec BTX without the need for a liquid recycle.

Accordingly, preferred gasoline hydrocracking conditions thus include a temperature of 450-580° C., a pressure of 0.3-5 MPa gauge and a Weight Hourly Space Velocity of 0.1-10 h−1. More preferred gasoline hydrocracking conditions include a temperature of 470-550° C., a pressure of 0.6-3 MPa gauge and a Weight Hourly Space Velocity of 0.2-6 h−1. Particularly preferred gasoline hydrocracking conditions include a temperature of 470-550° C., a pressure of 1-2 MPa gauge and a Weight Hourly Space Velocity of 0.4-2 h−1.

The "aromatic ring opening unit" refers to a refinery unit wherein the aromatic ring opening process is performed. Aromatic ring opening is a specific hydrocracking process that is particularly suitable for converting a feed that is relatively rich in aromatic hydrocarbon having a boiling point in the kerosene and gasoil boiling point range to produce LPG and, depending on the process conditions, a light-distillate (ARO-derived gasoline). Such an aromatic ring opening process (ARO process) is for instance described in U.S. Pat. Nos. 3,256,176 and 4,789,457. Such processes may comprise of either a single fixed bed catalytic reactor or two such reactors in series together with one or more fractionation units to separate desired products from unconverted material and may also incorporate the ability to recycle unconverted material to one or both of the reactors. Reactors may be operated at a temperature of 200-600° C., preferably 300-400° C., a pressure of 3-35 MPa, preferably 5 to 20 MPa together with 5-20 wt-% of hydrogen (in relation to the hydrocarbon feedstock), wherein said hydrogen may flow co-current with the hydrocarbon feedstock or counter current to the direction of flow of the hydrocarbon feedstock, in the presence of a dual functional catalyst active for both hydrogenation-dehydrogenation and ring cleavage, wherein said aromatic ring saturation and ring cleavage may be performed. Catalysts used in such processes comprise one or more elements selected from the group consisting of Pd, Rh, Ru, Ir, Os, Cu, Co, Ni, Pt, Fe, Zn, Ga, In, Mo, W and V in metallic or metal sulphide form supported on an acidic solid such as alumina, silica, alumina-silica and zeolites. In this respect, it is to be noted that the term "supported on" as used herein includes any conventional way to provide a catalyst which combines one or more elements with a catalytic support. A further aromatic ring opening process (ARO process) is described in U.S. Pat. No. 7,513,988. Accordingly, the ARO process may comprise aromatic ring saturation at a temperature of 100-500° C., preferably 200-500° C. and more preferably 300-500° C., a pressure of 2-10 MPa together with 5-30 wt-%, preferably 10-30 wt-% of hydrogen (in relation to the hydrocarbon feedstock) in the presence of an aromatic hydrogenation catalyst and ring cleavage at a temperature of 200-600° C., preferably 300-400° C., a pressure of 1-12 MPa together with 5-20 wt-% of hydrogen (in relation to the hydrocarbon feedstock) in the presence of a ring cleavage catalyst, wherein said aromatic ring saturation and ring cleavage may be performed in one reactor or in two consecutive reactors. The aromatic hydrogenation catalyst may be a conventional hydrogenation/hydrotreating catalyst such as a catalyst comprising a mixture of Ni, W and Mo on a refractory support, typically alumina. The ring cleavage catalyst comprises a transition metal or metal sulphide component and a support. Preferably the catalyst comprises one or more elements selected from the group consisting of Pd, Rh, Ru, Ir, Os, Cu, Co, Ni, Pt, Fe, Zn, Ga, In, Mo, W and V in metallic or metal sulphide form supported on an acidic solid such as alumina, silica, alumina-silica and zeolites. By adapting either single or in combination the catalyst composition, operating temperature, operating space velocity and/or hydrogen partial pressure, the process can be steered towards full saturation and subsequent cleavage of all rings or towards keeping one aromatic ring unsaturated and subsequent cleavage of all but one ring. In the latter case, the ARO process produces a light-distillate ("ARO-gasoline") which is relatively rich in hydrocarbon compounds having one aromatic ring.

As used herein, the term "dearomatization unit" relates to a refinery unit for the separation of aromatic hydrocarbons, such as BTX, from a mixed hydrocarbon feed. Such dearomatization processes are described in Folkins (2000) Benzene, Ullmann's Encyclopedia of Industrial Chemistry. Accordingly, processes exist to separate a mixed hydrocarbon stream into a first stream that is enriched for aromatics and a second stream that is enriched for paraffins and naphthenes. A preferred method to separate aromatic hydrocarbons from a mixture of aromatic and aliphatic hydrocarbons is solvent extraction; see e.g. WO 2012135111 A2. The preferred solvents used in aromatic solvent extraction are sulfolane, tetraethylene glycol and N-methylpyrolidone which are commonly used solvents in commercial aromatics extraction processes. These species are often used in combination with other solvents or other chemicals (sometimes called co-solvents) such as water and/or alcohols. Non-nitrogen containing solvents such as sulfolane are particularly preferred. Commercially applied dearomatization processes are less preferred for the dearomatization of hydrocarbon mixtures having a boiling point range that exceeds 250° C., preferably 200° C., as the boiling point of the solvent used in such solvent extraction needs to be lower than the boiling point of the aromatic compounds to be extracted. Solvent extraction of heavy aromatics is described in the art; see e.g. U.S. Pat. No. 5,880,325. Alternatively, other known methods than solvent extraction, such as molecular sieve separation or separation based on boiling point, can be applied for the separation of heavy aromatics in a dearomatization process.

A process to separate a mixed hydrocarbon stream into a stream comprising predominantly paraffins and a second stream comprising predominantly aromatics and naphthenes comprises processing said mixed hydrocarbon stream in a solvent extraction unit comprising three main hydrocarbon processing columns: solvent extraction column, stripper column and extract column. Conventional solvents selective for the extraction of aromatics are also selective for dissolving light naphthenic and to a lesser extent light paraffinic species hence the stream exiting the base of the solvent extraction column comprises solvent together with dissolved aromatic, naphthenic and light paraffinic species. The stream exiting the top of the solvent extraction column (often termed the raffinate stream) comprises the relatively insoluble, with respect to the chosen solvent) paraffinic species. The stream exiting the base of the solvent extraction column is then subjected, in a distillation column, to evaporative stripping in which species are separated on the basis of their relative volatility in the presence of the solvent. In the presence of a solvent, light paraffinic species have higher relative volatilities than naphthenic species and especially aromatic species with the same number of carbon atoms, hence the majority of light paraffinic species may be concentrated in the overhead stream from the evaporative stripping column. This stream may be combined with the raffinate stream from the solvent extraction column or collected as a separate light hydrocarbon stream. Due to their relatively low volatility the majority of the naphthenic and especially aromatic species are retained in the combined solvent and dissolved hydrocarbon stream exiting the base of this column. In the final hydrocarbon processing column of the extraction unit, the solvent is separated from the dissolved hydrocarbon species by distillation. In this step the solvent, which has a relatively high boiling point, is recovered as the base stream from the column whilst the dissolved hydrocarbons, comprising mainly aromatics and naphthenic species, are recovered as the vapor stream exiting the top of the column. This latter stream is often termed the extract.

The process of the present invention may require removal of sulfur from certain crude oil fractions to prevent catalyst deactivation in downstream refinery processes, such as catalytic reforming or fluid catalytic cracking. Such a hydrodesulfurization process is performed in a "HDS unit" or "hydrotreater"; see Alfke (2007) loc. cit. Generally, the hydrodesulfurization reaction takes place in a fixed-bed reactor at elevated temperatures of 200-425° C., preferably of 300-400° C. and elevated pressures of 1-20 MPa gauge, preferably 1-13 MPa gauge in the presence of a catalyst comprising elements selected from the group consisting of Ni, Mo, Co, W and Pt, with or without promoters, supported on alumina, wherein the catalyst is in a sulfide form.

In a further embodiment, the process further comprises a hydrodealkylation step wherein the BTX (or only the toluene and xylenes fraction of said BTX produced) is contacted with hydrogen under conditions suitable to produce a hydrodealkylation product stream comprising benzene and fuel gas.

The process step for producing benzene from BTX may include a step wherein the benzene comprised in the hydrocracking product stream is separated from the toluene and xylenes before hydrodealkylation. The advantage of this separation step is that the capacity of the hydrodealkylation reactor is increased. The benzene can be separated from the BTX stream by conventional distillation.

Processes for hydrodealkylation of hydrocarbon mixtures comprising C6-C9 aromatic hydrocarbons are well known in the art and include thermal hydrodealkylation and catalytic hydrodealkylation; see e.g. WO 2010/102712 A2. Catalytic hydrodealkylation is preferred as this hydrodealkylation process generally has a higher selectivity towards benzene than thermal hydrodealkylation. Preferably catalytic hydrodealkylation is employed, wherein the hydrodealkylation catalyst is selected from the group consisting of supported chromium oxide catalyst, supported molybdenum oxide catalyst, platinum on silica or alumina and platinum oxide on silica or alumina. The process conditions useful for hydrodealkylation, also described herein as "hydrodealkylation conditions", can be easily determined by the person skilled in the art. The process conditions used for thermal hydrodealkylation are for instance described in DE 1668719 A1 and include a temperature of 600-800° C., a pressure of 3-10 MPa gauge and a reaction time of 15-45 seconds. The process conditions used for the preferred catalytic hydrodealkylation are described in WO 2010/102712 A2 and preferably include a temperature of 500-650° C., a pressure of 3.5-8 MPa gauge, preferably of 3.5-7 MPa gauge and a Weight Hourly Space Velocity of 0.5-2 h−1. The hydrodealkylation product stream is typically separated into a liquid stream (containing benzene and other aromatics species) and a gas stream (containing hydrogen, H2S, methane and other low boiling point hydrocarbons) by a combination of cooling and distillation. The liquid stream may be further separated, by distillation, into a benzene stream, a C7 to C9 aromatics stream and optionally a middle-distillate stream that is relatively rich in aromatics. The C7 to C9 aromatic stream may be fed back to reactor section as a recycle to increase overall conversion and benzene yield. The aromatic stream which contains polyaromatic species such as biphenyl, is preferably not recycled to the reactor but may be exported as a separate product stream and recycled to the integrated process as middle-distillate ("middle-distillate produced by hydrodealkylation"). The gas stream contains significant quantities of hydrogen may be recycled back the hydrodealkylation unit via a recycle gas compressor or to any other refinery that uses hydrogen as a feed. A recycle gas purge may be used to control the concentrations of methane and H2S in the reactor feed.

As used herein, the term "gas separation unit" relates to the refinery unit that separates different compounds comprised in the gases produced by the crude distillation unit and/or refinery unit-derived gases. Compounds that may be separated to separate streams in the gas separation unit comprise ethane, propane, butanes, hydrogen and fuel gas mainly comprising methane. Any conventional method suitable for the separation of said gases may be employed. Accordingly, the gases may be subjected to multiple compression stages wherein acid gases such as CO2 and H2S may be removed between compression stages. In a following step, the gases produced may be partially condensed over stages of a cascade refrigeration system to about where only the hydrogen remains in the gaseous phase. The different hydrocarbon compounds may subsequently be separated by distillation.

A process for the conversion of alkanes to olefins involves "steam cracking" or "pyrolysis". As used herein, the term "steam cracking" relates to a petrochemical process in which saturated hydrocarbons are broken down into smaller, often unsaturated, hydrocarbons such as ethylene and propylene. In steam cracking gaseous hydrocarbon feeds like ethane, propane and butanes, or mixtures thereof, (gas cracking) or liquid hydrocarbon feeds like naphtha or gasoil (liquid cracking) is diluted with steam and briefly heated in a furnace without the presence of oxygen. Typically, the reaction temperature is 750-900° C., but the reaction is only allowed to take place very briefly, usually with residence times of 50-1000 milliseconds. Preferably, a relatively low process pressure is to be selected of atmospheric up to 175 kPa gauge. Preferably, the hydrocarbon compounds ethane, propane and butanes are separately cracked in accordingly specialized furnaces to ensure cracking at optimal conditions. After the cracking temperature has been reached, the gas is quickly quenched to stop the reaction in a transfer line heat exchanger or inside a quenching header using quench oil. Steam cracking results in the slow deposition of coke, a form of carbon, on the reactor walls. Decoking requires the furnace to be isolated from the process and then a flow of steam or a steam/air mixture is passed through the furnace coils. This converts the hard solid carbon layer to carbon monoxide and carbon dioxide. Once this reaction is complete, the furnace is returned to service. The products produced by steam cracking depend on the composition of the feed, the hydrocarbon to steam ratio and on the cracking temperature and furnace residence time. Light hydrocarbon feeds such as ethane, propane, butane or light naphtha give product streams rich in the lighter polymer grade olefins, including ethylene, propylene, and butadiene. Heavier hydrocarbon (full range and heavy naphtha and gas oil fractions) also give products rich in aromatic hydrocarbons.

To separate the different hydrocarbon compounds produced by steam cracking the cracked gas is subjected to a fractionation unit. Such fractionation units are well known in the art and may comprise a so-called gasoline fractionator where the heavy-distillate ("carbon black oil") and the middle-distillate ("cracked distillate") are separated from the light-distillate and the gases. In the subsequent optional quench tower, most of the light-distillate produced by steam cracking ("pyrolysis gasoline" or "pygas") may be separated from the gases by condensing the light-distillate. Subsequently, the gases may be subjected to multiple compression stages wherein the remainder of the light distillate may be separated from the gases between the compression stages. Also acid gases (CO2 and H2S) may be removed between compression stages. In a following step, the gases produced by pyrolysis may be partially condensed over stages of a cascade refrigeration system to about where only the hydrogen remains in the gaseous phase. The different hydrocarbon compounds may subsequently be separated by simple distillation, wherein the ethylene, propylene and C4 olefins are the most important high-value chemicals produced by steam cracking. The methane produced by steam cracking is generally used as fuel gas, the hydrogen may be separated and recycled to processes that consume hydrogen, such as hydrocracking processes. The acetylene produced by steam cracking preferably is selectively hydrogenated to ethylene. The alkanes comprised in the cracked gas may be recycled to the process for olefins synthesis.

The term "propane dehydrogenation unit" as used herein relates to a petrochemical process unit wherein a propane feedstream is converted into a product comprising propylene and hydrogen. Accordingly, the term "butane dehydrogenation unit" relates to a process unit for converting a butane feedstream into C4 olefins. Together, processes for the dehydrogenation of lower alkanes such as propane and butanes are described as lower alkane dehydrogenation process. Processes for the dehydrogenation of lower alkanes are well-known in the art and include oxidative dehydrogenation processes and non-oxidative dehydrogenation processes. In an oxidative dehydrogenation process, the process heat is provided by partial oxidation of the lower alkane(s) in the feed. In a non-oxidative dehydrogenation process, which is preferred in the context of the present invention, the process heat for the endothermic dehydrogenation reaction is provided by external heat sources such as hot flue gases obtained by burning of fuel gas or steam. In a non-oxidative dehydrogenation process the process conditions generally comprise a temperature of 540-700° C. and an absolute pressure of 25-500 kPa. For instance, the UOP Oleflex process allows for the dehydrogenation of propane to form propylene and of (iso)butane to form (iso)butylene (or mixtures thereof) in the presence of a catalyst containing platinum supported on alumina in a moving bed reactor; see e.g. U.S. Pat. No. 4,827,072. The Uhde STAR process allows for the dehydrogenation of propane to form propylene or of butane to form butylene in the presence of a promoted platinum catalyst supported on a zinc-alumina spinel; see e.g. U.S. Pat. No. 4,926,005. The STAR process has been recently improved by applying the principle of oxydehydrogenation. In a secondary adiabatic zone in the reactor part of the hydrogen from the intermediate product is selectively converted with added oxygen to form water. This shifts the thermodynamic equilibrium to higher conversion and achieves a higher yield. Also the external heat required for the endothermic dehydrogenation reaction is partly supplied by the exothermic hydrogen conversion. The Lummus Catofin process employs a number of fixed bed reactors operating on a cyclical basis. The catalyst is activated alumina impregnated with 18-20 wt-% chromium; see e.g. EP 0 192 059 A1 and GB 2 162 082 A. The Catofin process has the advantage that it is robust and capable of handling impurities which would poison a platinum catalyst. The products produced by a butane dehydrogenation process depends on the nature of the butane feed and the butane dehydrogenation process used. Also the Catofin process allows for the dehydrogenation of butane to form butylene; see e.g. U.S. Pat. No. 7,622,623.

The present invention will be discussed in the next Example which example should not be interpreted as limiting the scope of protection.

The sole FIGURE provides a schematic flow sheet of an embodiment of the present invention.

EXAMPLE

The process scheme can be found in the sole FIGURE. A hydrocarbon feedstock 29 is fed into a reaction area for ringopening 4 and its reaction products, which are generated from said reaction area, are separated into an overhead stream 9 and a side stream 13. The side stream 13 is fed into a gasoline hydrocracker (GHC) unit 5, wherein the reaction products of said GHC unit 5 are separated into an overhead gas stream 33, comprising light components such C2-C4 paraffins, hydrogen and methane, and a stream 15 comprising predominantly aromatic hydrocarbon compounds and non-aromatic hydrocarbon compounds. The overhead gas stream 33 from the gasoline hydrocracker (GHC) unit 5 is fed as feedstock 8 to a steam cracker unit 1.

In a preferred embodiment hydrocarbon feedstock 7 can be divided in a feed 28 and a feed 12, wherein feed 28 is pretreated in an aromatics extraction unit 3. From aromatics extraction unit 3 its bottom stream 34 is fed into said reaction area for ringopening 4 and its overhead stream 26 is fed into said steam cracker unit 1. The aromatics extraction unit 3 is chosen from the group of the type of a distillation unit, a solvent extraction unit and a molecular sieve, or even a combination thereof. For example light Naphtha 6 is a feedstock directly sent to the steam cracker unit 1.

In a preferred embodiment the C2-C4 paraffins are separated from said overhead gas stream 33, and the C2-C4 paraffins thus separated are sent to the furnace section of steam cracker unit 1. In another preferred embodiment the C2-C4 paraffins are separated in individual streams, each stream predominantly comprising C2 paraffins, C3 paraffins and C4 paraffins, respectively, and each individual stream is fed to a specific furnace section of steam cracker unit 1. Such a separation of C2-C4 paraffins from said overhead gas stream 33 is carried out by cryogenic distillation or solvent extraction.

The reaction products 18 of said steam cracking unit 1 are separated in separator 2 into an overhead stream 17, comprising C2-C6 alkanes, a middle stream 14, which contains C2-olefins, C3-olefins and C4-olefins, and a first bottom stream 19 comprising C9+ hydrocarbons, and a second bottom stream 10 comprising aromatic hydrocarbon compounds and non-aromatic hydrocarbon compounds. Second bottom stream 10 comprises pygas. Hydrogen and methane can be recovered from separator 2 as well and re-used elsewhere. The overhead stream 17 is returned to said steam cracking unit 1. Second bottom stream 10 is fed into said gasoline hydrocracker (GHC) unit 5. First bottom stream 19 predominantly containing carbon black oil (CBO) and cracked distillates (CD) is fed into said reaction area for ringopening 4.

In a preferred embodiment stream 15 from said gasoline hydrocracker (GHC) unit 5 is further separated in a BTX rich fraction and in heavy fraction (not shown). Overhead stream 33 from the gasoline hydrocracker (GHC) unit 5 is divided into a stream 8 and a stream 20, wherein stream 20 is fed to a dehydrogenation unit 23. As mentioned before, it is preferred to send only the C3-C4 fraction of overhead stream 33 to the dehydrogenation unit 23. Overhead stream 9 from the reaction area for ring opening 4 can also be fed into dehydrogenation unit 23 and/or into steam cracker unit 1. And for this stream 9 it is also preferred to send only the C3-C4 fraction of stream 9 to the dehydrogenation unit 23. According to a preferred embodiment the C3-C4 fractions are recovered from both stream 9 and stream 33 in a single process unit and these C3-C4 fractions are sent to the dehydrogenation unit 23. This means that after suitable processing hydrogen and methane are removed from stream 9 and stream 33 before sending stream 20 to the dehydrogenation unit 23.

In a preferred embodiment a stream 25 rich in mono aromatics is recovered from said hydrocarbon feedstock 24 and stream 25 thus recovered is directly fed into said gasoline hydrocracker (GHC) unit 5. The remaining part 32 of feedstock 24 is sent to a reaction area for ringopening 4.

Hydrogen 27 can be recovered from the reaction products 18 of said steam cracking unit 1 and the hydrogen 27 thus recovered can be sent to said gasoline hydrocracker (GHC) unit 5 and/or said reaction area for ring opening 4 via line 22 and line 31, respectively. In another embodiment it is also possible to recover hydrogen 21 from said dehydrogenation unit 23 and the hydrogen 21 thus recovered can be fed into said gasoline hydrocracker (GHC) unit 5 and/or said reaction area for ring opening 4.

According to the process scheme of FIGURE feedstock 7 can be divided in a feedstock 28 and a feedstock 12, wherein feedstock 12 does not undergo an extraction in the aromatics extraction unit 3. Feedstock 12 can be mixed with other types of feedstock 29, if appropriate, and the combined feedstock 16, after being mixed, if necessary, with the bottom stream 34 of unit 3, is now indicated as reference number 24. In a preferred embodiment mono aromatics 25 are separated from feedstock 24 in unit 30 and the stream 32 thus obtained is fed into unit 4.

The Example disclosed herein makes a distinction between several cases.

According to case 1 kerosine as feedstock is sent directly to steam cracker unit (comparative example).

According to case 2 (example according to the invention) kerosine as feedstock is sent to a reaction area for ringopening and the side stream thereof is sent to a gasoline hydrocracker (GHC) unit, the LPG fraction from GHC being steam cracked.

According to case 3 (example according to the invention) kerosine as feedstock is first pretreated in an aromatics extraction unit, wherein the paraffins fraction is sent to a steam cracker unit and the naphthenes and aromatics fraction is sent to a reaction area for ringopening and the side stream thereof is sent to a gasoline hydrocracker (GHC) unit, the LPG fraction from GHC being steam cracked.

Case 4 (example according to the present invention) is similar to case 2 but the feedstock in case 4 is now LVGO.

The characteristics of kerosine and LVGO can be found in Table 1.

TABLE 1

| characteristics of kerosine and LVGO | | | |
|---|---|---|---|
| | | Kerosine | LVGO |
| n-Paraffins | wt-% | 23.7 | 18.3 |
| i-Paraffins | wt-% | 17.9 | 13.8 |
| Naphthenes | wt-% | 37.4 | 35.8 |
| Aromatics | wt-% | 21.0 | 32.0 |
| Density 60 F. | kg/L | 0.810 | 0.913 |
| IBP | °C. | 174 | 306 |
| BP10 | °C. | 196 | 345 |
| BP30 | °C. | 206 | 367 |
| BP50 | °C. | 216 | 384 |
| BP70 | °C. | 226 | 404 |
| BP90 | °C. | 242 | 441 |
| FBP | °C. | 266 | 493 |

The conditions of the steam cracker unit are as follows: ethane and propane furnaces:coil outlet temperature=845° C., steam-to-oil-ratio=0.37, C4-furnaces: coil outlet temperature=820° C., Steam-to-oil-ratio=0.37, liquid furnaces: coil outlet temperature=820° C., steam-to-oil-ratio=0.37.

Table 2 shows the battery limit product slate (wt. % of feedstock).

TABLE 2

| the battery limit product slate (wt. % of feedstock) | | | | |
|---|---|---|---|---|
| BATTERY LIMIT PRODUCT SLATE | CASE 1 KEROSINE to SC | CASE 2 KEROSINE TO PARTIAL RINGOPENING + GHC + SC | CASE 3 KEROSINE TO DEARO, paraffins to SC, arom + naphthenes to PARO – GHC | CASE 4 LVGO TO PARTIAL RINGOPENING + GHC + SC |
| H2 production (SC) | 0.6 | 2.5 | 1.6 | 2.5 |
| H2 consumption (P-ARO + GHC) | 0 | 3.5 | 2.1 | 4.5 |
| CH4 | 14.4 | 18.6 | 15.8 | 18.9 |
| ETHYLENE | 29.0 | 47.7 | 42.6 | 48.6 |
| PROPYLENE | 15.1 | 12.4 | 15.4 | 12.6 |
| BUTADIENE | 4.9 | 2.4 | 4.1 | 2.5 |
| ISO-BUTENE | 2.0 | 0.5 | 0.9 | 0.5 |
| BENZENE | 7.9 | 5.4 | 7.2 | 5.0 |
| TX CUT | 4.0 | 6.4 | 7.1 | 5.6 |
| STYRENE | 1.6 | 3.0 | 3.2 | 2.6 |
| OTHER C7-C8 | 2.3 | 0.3 | 0.6 | 0.3 |
| C9 RESIN FEED | 4.8 | 0.1 | 0.2 | 0.1 |
| CD | 1.6 | 0.0 | 0.2 | 0.0 |
| CBO | 11.6 | 0.5 | 1.0 | 0.6 |
| % HIGH VALUE CHEMICALS | 66.8 | 78.1 | 81.1 | 77.7 |

For each case the hydrogen balance was calculated. For case 1 the H2 balance is +0.6%, for case 2 the H2 balance is −1.0%, for case 3 the H2 balance is −0.5%, and for case 4 the H2 balance is −2.0%, respectively.

The data presented above show that the presence of a reaction area for ringopening and gasoline hydrocracking (GHC) of the diesel converts aromatics into BTX and LPG and converts naphthenes into LPG. The steam cracker product from this LPG contains increased olefins yields (ethylene and propylene), increased CH4 yield and decreased C9+ yield (compared to steam cracking diesel straight away as in case 1). The present inventors found that this effect also applies to LVGO and HVGO. It is to be noted that a reaction area for ringopening requires additional $H_2$, i.e. a negative hydrogen balance for cases 2, 3, and 4. Moreover, when applying the propane dehydrogenation (PDH)/butane dehydrogenation (BDH) options a positive hydrogen balance can be achieved. Furthermore, the rise in ethylene is also highly remarkable in the method according to the present invention.

The invention claimed is:

1. A process for increasing the production of a light olefin hydrocarbon compound from a hydrocarbon feedstock, consisting of the steps of:

feeding a hydrocarbon feedstock into a reaction area for ring opening, wherein the process conditions prevailing in said reaction area for ring opening are a temperature from 300° C. to 500° C. and a pressure from 2 to 10 MPa together with from 100 to 300 kg of hydrogen per 1,000 kg of feedstock over an aromatic hydrogenation catalyst, wherein said aromatic hydrogenation catalyst comprises from 0.0001 to 5 weight % of one or more metals selected from the group consisting of Ni, W, and Mo, passing the resulting stream to a ring cleavage unit at a temperature from 200° C. to 600° C. and a pressure from 1 to 12 MPa together with from 50 to 200 kg of hydrogen per 1,000 kg of said resulting stream over a ring cleavage catalyst comprising from 0.0001 to 5 weight % of one or more metals selected from the group consisting of Pd, Ru, Ir, Os, Cu, Co, Ni, Pt, Fe, Zn, Ga, In, Mo, W, and V on a support selected from the group of synthetic zeolites having the characteristics of ZSM-5, ZSM-11, ZSM-12, ZSM-23, Beta and MCM-22;

separating reaction products, which are generated from said reaction area, into an overhead stream and a side stream;

feeding the side stream from (b) to a gasoline hydrocracker (GHC) unit operating at a temperature range of 400-580° C., a Weight Hourly Space Velocity (WHSV) of 0.1-10 h−1 and a pressure range of 0.3-5 MPa, wherein said gasoline hydrocracker (GHC) unit is operated at a temperature higher than said ring opening reaction area, and wherein said gasoline hydrocracker (GHC) unit is operated at a pressure lower than said ring opening reaction area, separating reaction products of said GHC of step (c) into an overhead gas stream, comprising C2-C4 paraffins, hydrogen and methane and a stream comprising aromatic hydrocarbon compounds and non-aromatic hydrocarbon compounds, feeding the overhead gas stream from the gasoline hydrocracker (GHC) unit into a steam cracker unit;

separating reaction products of said steam cracking unit into an overhead stream, comprising C2-C6 alkanes, a middle stream comprising C2-olefins, C3-olefins and C4-olefins, and a first bottom stream comprising predominantly carbon black oil (CBO) and cracked distillates (CD), and a second bottom stream comprising aromatic hydrocarbon compounds and non-aromatic hydrocarbon compounds; and feeding said first bottom stream into said reaction area for ring opening;

wherein the hydrocarbon feedstock consists of a fraction of at least one member selected from the group consisting of a conventional petroleum having an API gravity of more than 20° API as measured by the ASTM D287 standard and a light crude oil having an API gravity of more than 30° API.

* * * * *